UNITED STATES PATENT OFFICE.

OTTO SCHROEN, OF NAPLES, ITALY.

PROCESS OF TREATING TOMATOES.

942,287.  Specification of Letters Patent.  Patented Dec. 7, 1909.

No Drawing.   Application filed August 29, 1907.  Serial No. 390,684.

*To all whom it may concern:*

Be it known that I, OTTO SCHROEN, a subject of the Emperor of Germany, residing at Naples, Italy, have invented certain new and useful Improvements in Processes of Treating Tomatoes; and I do hereby declare the following to be a full, clear, and exact description of the invention, such as will enable others skilled in the art to which it appertains to make and use the same.

For the purpose of preserving tomatoes in the condition of a purée or sauce, it has hitherto been the practice to pack them in air-tight cans, jars, or bottles. This method, however, is attended with drawbacks. In the first place, the percentage of actual tomatoes in such a vessel is extremely small in comparison with the gross weight of the canned or bottled preserve. For instance, a can of tomatoes weighing 400 grams contains really only about 60 grams of tomatoes, there being about 260 grams of water, while the can itself weighs say 80 grams. Thus in such a can there is in reality only about 15% of tomatoes. Then again, when once the can has been opened, the contents must be consumed within, a short-period, as the tomato purée does not keep when air has access to it. The attempts which have been made to preserve tomato purée by the addition of salicylic acid have not proved successful, since the percentage of salicylic acid, necessary for effective preservation, exceeds the quantity permitted by the sanitary authorities of most countries.

My invention relates to the preparation of a dry, pulverized or otherwise comminuted mass of tomatoes, which can be used either in such comminuted state, or pressed into tablets, or bars, or some other convenient shape.

Owing to complete drying (air dry) the product will keep without the aid of salicylic acid, or any other preservative whatever, and furthermore presents the advantage for the consumer that it can be used in small quantities at a time. The taste of the product is unaltered and even excels that of tomato purée, the delicate flavor of which becomes ultimately affected by long contact with the walls of the can.

In preparing my improved product I proceed as follows: Fresh tomatoes are washed, and any stalks or the like removed, whereupon they are sliced or pounded in a suitable machine. The mixture of liquid, pulp, skins, and seeds which runs off, is then boiled in a vessel for about half an hour. If the boiler is exposed to direct fire the mass must be stirred, a mechanical agitator being preferably provided for the purpose. If the heating is effected by means of steam pipes conducting below the boiler, the temperature of the steam should not be allowed to rise much over 100 degrees centigrade. The purpose of the boiling is to facilitate subsequent sieving. It may be postponed until after the sieving, but it should not be omitted, if a really delicately flavored product is desired; for a purée which is evaporated solely in a vacuum is not truly palatable. Tomatoes should be boiled for about half an hour at a considerable temperature with access of air, in order to produce that chemical change which renders them thoroughly pleasant to the palate. The mass is then (or directly after comminution) rubbed through a fine sieve (say 1–1½ mm. mesh), so that seeds and fruit skins remain behind, the pulp passing through in a finely divided state with the juice. This watery paste, which may contain some 95% water, is then evaporated and dried in suitable vessels, trays, drums, chambers, or the like, *in vacuo*, at a low temperature, to the exclusion of air. In order to obtain a good product, resembling the fresh fruit in color and flavor, it is necessary, especially in the later stages of drying, to keep down the temperature as far as possible, and at all events not to exceed 50 degrees centigrade. At the commencement, therefore, so long as the amount of water in the product is large, the temperature of the water bath may be kept at about 20 degrees centigrade above the boiling point of the liquid *in vacuo* (but not over 50 degrees centigrade)

and the temperature subsequently diminished for complete drying. The first part of the drying is best carried out in vacuum evaporators, until the mass is so thick that it only contains about 40% water. The product is then spread out on trays and completely dried in vacuum-chambers.

As the tomato is rich in vegetable gliadin and is also hygroscopic, it is not possible, when the proper temperatures are observed for retention of the flavor and color, by spreading out on the trays to so far dry the mass as to render it capable of being ground. For a high temperature would have to be employed, which, however, would spoil the flavor of the pasty mass. In order to dry the palatable product till capable of being ground, it is requisite to draw out the paste, containing about 40% water, into fine threads or thin strips, and to distribute it in this form over the trays. For this purpose, for instance, a cylinder press may be used, the bottom of which has a perforated plate (the holes not being over 1 mm. diameter). Below this press the drying-trays are pushed and thus filled with fine threads. The method of spreading the paste over the trays would also be attended by the drawback that the dry paste would adhere so firmly to the trays by reason of the high percentage of gliadin, that it would have to be chipped off with chisels. This would greatly impede, if not wholly obstruct, wholesale manufacture, for the chipping would have to proceed very rapidly, otherwise the hygroscopic paste would again absorb so much moisture from the air that it would no longer be capable of being ground. These conditions could not be fulfilled without much waste of material and great outlay of labor. When drawn out into fine threads the paste only adheres at a few places and the entire mass can be removed by a jerk from the trays.

In the last stages of drying it would appear advantageous in order to accelerate the process, to admit a little air. As the oxygen, during prolonged action on the warmed mass causes changes, resulting in darkening and change of the flavor, it is well to employ air freed from oxygen, or carbonic acid, etc. For this purpose very small quantities of air, etc. are sufficient, whose admission only alters the vacuum by a few millimeters, so that also the evaporation-temperature of the vacuum is only altered by a small amount. The drying is continued until the product is capable of being ground. At the same time, it must be remembered that the product is very hygroscopic and when exposed to moist air, loses its capability of being ground. It should, therefore, be ground immediately after cooling, or should be protected in suitable vessels or chambers from any considerable changes of air and humidity. This is best done in ball mills. Iron ball mills can not be employed, as a product produced in such would give a very dark sauce, the taste of which also would be affected. The ball mills must also be so arranged that drum and balls can be taken out and cleaned, as owing to the hygroscopic character of the product, it can not be prevented that after several changes, balls and interior walls become sticky, whereby the capacity of the mill is greatly affected. Otherwise the product is wholly or partly ground; for the subsequent rapid dissolving in hot water, it is not absolutely necessary to grind the product in the full sense of the word, it being sufficient to comminute or reduce it in any suitable machine, to flakes or grains of about 1 mm. in size.

If the product is brought upon the market in pulverized condition, it may be packed in a paper bag. It will, however, probably be more convenient to press the product (dry pressure) into tablets or bars of a definite weight. The pressing should be done in such manner that the tablets are sufficiently firm in order to admit of transport, etc., but at the same time allow of their being readily rubbed down with the fingers, so that when the preparation is added to a certain quantity of hot water, it will quickly produce a uniformly thick purée.

Having now particularly described and ascertained the nature of my said invention and in what manner the same is to be performed, I declare that what I claim is:

1. In the process of treating tomatoes, reducing the tomatoes, boiling their pulp and juice with access of air, shredding and then drying the resulting product substantially out of contact with the air and *in vacuo* to a consistency capable of being ground.

2. The process of treating tomatoes which comprises reducing and sieving the tomatoes, boiling them with access of air, evaporating the resulting product *in vacuo* to a pasty condition, shredding the product and subjecting it to a final drying *in vacuo* till it is sufficiently hard to be ground.

3. The process of treating tomatoes which comprises boiling the pulp and juice with access of air, evaporating the resulting product *in vacuo* to a pasty condition, shredding the pasty mass, drying the shredded mass in an atmosphere substantially free from oxygen until sufficiently hard to grind.

4. The process of treating tomatoes which consists in reducing and sieving the tomatoes, boiling the juice and pulp with access of air, evaporating the resulting product *in vacuo* to a pasty consistency, shredding the pasty mass, drying the shredded mass at a low temperature in an atmosphere substantially free from oxygen, grinding and dry pressing the ground mass before hygroscopic absorption sets in.

5. The process of treating tomatoes which comprises reducing and sieving the tomatoes, boiling them with access of air, evaporating the product *in vacuo* to a pasty condition, forming the product into filaments and drying *in vacuo* at a comparatively low temperature.

In testimony that I claim the foregoing as my invention, I have signed my name in presence of two subscribing witnesses.

OTTO SCHROEN.

Witnesses:
 ABRAHAM SCHLESINGER,
 LOUIS F. MUELLER.